Nov. 9, 1965   R. LA VOIE   3,216,456
DEVICE FOR TESTING FOR LEAKS IN VENT PIPES OR THE LIKE
Filed Jan. 20, 1964
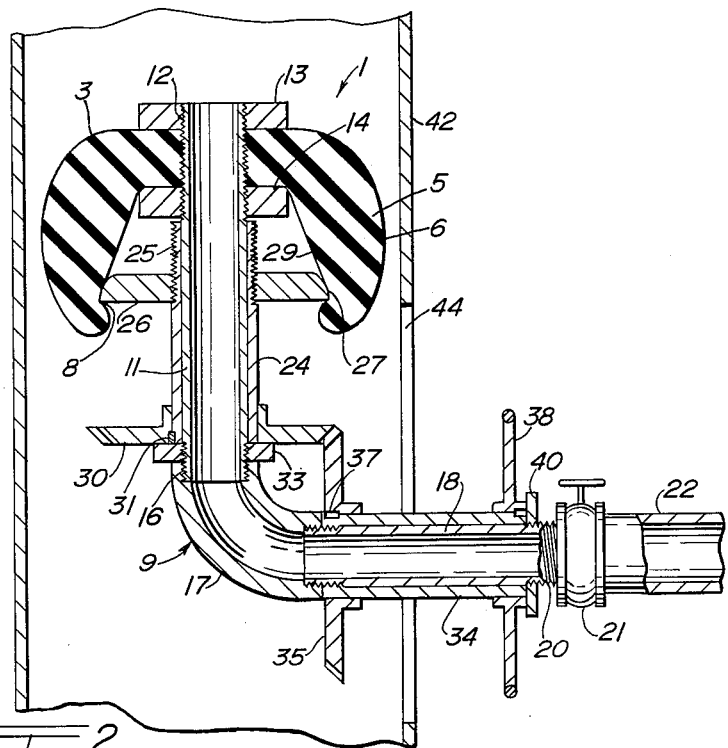
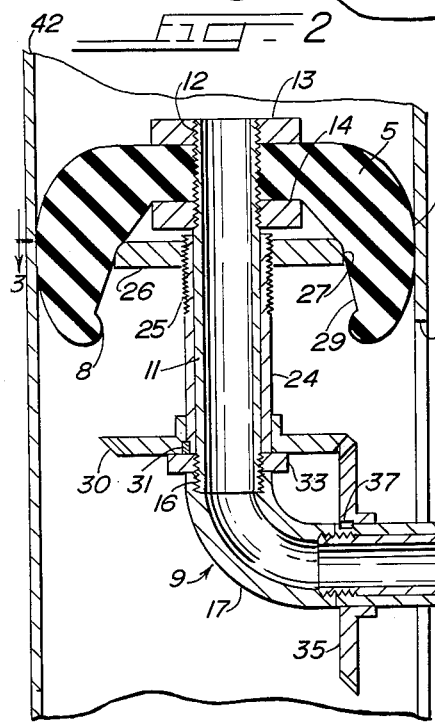
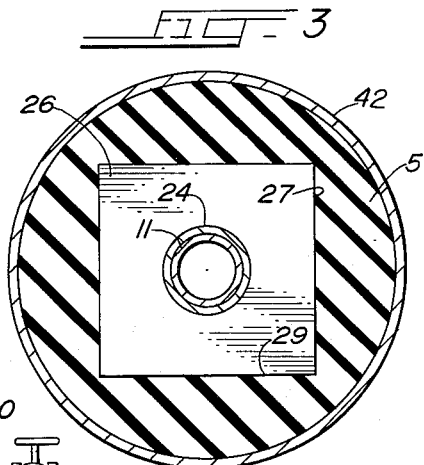
INVENTOR.
RICHARD LA VOIE
BY Morris Spector
ATTY.

United States Patent Office 3,216,456
Patented Nov. 9, 1965

3,216,456
DEVICE FOR TESTING FOR LEAKS IN VENT PIPES OR THE LIKE
Richard La Voie, 2129 N. Moody Drive, Chicago 39, Ill.
Filed Jan. 20, 1964, Ser. No. 338,647
4 Claims. (Cl. 138—90)

This invention relates generally to leak detection, and more particularly to a device for testing for leaks in plumbing vent pipes, and the like.

In multi-story buildings, especially those having a large number of floors, the vent pipes for the plumbing are necessarily assembled together from a number of sections of pipe since these vent pipes must extend from the basement of the building upwardly through the roof. It is desirable that the vent pipes be free from leaks within the building or otherwise a leak at one or more of the floors of the building may result in objectionable odors from the plumbing being emitted within the building.

It is an object of the present invention to provide a device for testing for leaks in plumbing vent pipes and is particularly adaptable for use in buildings under construction so that if any leaks are detected they may be repaired before the vent becomes inaccessible as a result of further construction of the building.

It is a further object of the present invention to provide a device of the type stated which is relatively inexpensive, reliable in operation, and requires little skill in the use of same.

In accordance with the objects of the present invention, a device embodying the invention comprises a radially expansible and contractable plug that is mounted on a conduit which extends axially through the plug and is also bent to extend laterally to one side of the plug. The plug and conduit may be inserted into the vent pipe through an opening in the wall thereof with the laterally extending part of the conduit projecting through the opening in the pipe wall. A mechanism is provided for expanding the plug radially to close the vent pipe. This mechanism is preferably mounted on the conduit and is conveniently operable from the exterior of the pipe. A valve or other suitable closure may be provided for the conduit to open and close the same. With the pipe closed by the plug and the valve in the conduit closed, the pipe may be filled with water above the plug. After a sufficient time the water level in the vent pipe may be checked. If there is no drop in the level the pipe may be considered free of leaks. If there is a drop, the pipe is checked to determine the place of leakage and repaired. With the pipe still closed by the plug, the valve in the conduit may be opened to drain the water from the pipe through the conduit, and then the plug may be radially contracted by operation of the aforesaid mechanism so that the plug and other parts of the device within the pipe may be removed therefrom through the opening in the pipe wall.

In the drawing:

FIG. 1 is a vertical sectional view of a device constructed in accordance with and embodying the present invention and shown with the plug in the contracted position within the vent pipe;

FIG. 2 is a sectional view similar to FIG. 1 and showing the plug in the expanded position; and FIG. 3 is a fragmentary sectional view taken along line 3—3 of FIG. 2.

Referring now in more detail and by reference characters to the drawing, 1 designates a leak testing device comprising an inverted cup-shaped plug 3 that may be formed of an elastomer such as rubber, plastic, or other suitable resilient material. The plug 3 has a relatively thick end wall 4 and an integral annular skirt 5 that has an exterior surface of revolution 6 which is arcuate in cross section. At its lower end, the skirt 5 terminates in a radially inwardly projecting lip 8.

Extending axially through the plug 3 and also laterally thereof is a conduit, generally designated at 9. The conduit 9 may consist of a tube 11 which extends axially through the end wall 4 and has a thread 12 for receiving nuts 13, 14 which are on opposite sides of the end wall 4 and which secure the plug 3 to the tube 11. The other end of the tube 11 projects downwardly beyond the lower end of the plug skirt 5 and terminates in a threaded end 16 for receiving one end of an elbow 17. The other end of the elbow 17 is threadedly connected to a tube 18 that projects laterally of the plug 3 and terminates in a threaded end 20. One end of the housing of a conventional drain valve 21 may be threaded onto the end 20, and a tube or extension pipe 22 may be threaded into the other end of the drain valve housing. The tubes 11, 18 and 22 may be of a conventional size of pipe stock cut to the appropriate length and threaded. Furthermore, the elbow 17 may be a conventional fitting suitable for the tubes 11, 18.

Rotatably mounted on the tube 11 is a sleeve 24, the upper end of which has an external left hand thread 25 for receiving a plug-expanding nut 26. At its periphery 27 the nut is square in cross section and engages an internal surface 29 on the plug skirt 5, the surface 29 defining an axial cavity square in cross section. The cavity, furthermore, decreases or tapers from a maximum perimetral size at the lip 8 to a minimum perimetral size at the end wall 4. A bevel gear 30 is mounted on the end of the sleeve 24 which is adjacent to the threaded tube end 16 and is rigidly secured to the sleeve 24 in any suitable manner, as by a key 31; and a thrust nut or washer 33 may be threaded onto the end 16 just below the sleeve 24.

Rotatably mounted on the tube 18 is a sleeve 34 having a bevel gear 35 suitably secured thereto as by a key 37. The bevel gear 35 meshes with the bevel gear 30. At the end of the sleeve 34 that is adjacent to the thread 20 a hand wheel 38 may, if desired, be keyed or otherwise rigidly mounted on the sleeve 34. A nut 40 may be threaded onto the thread 20 to prevent axial retraction of the sleeve 24 from the tube 18.

In use, the plug 3 is in its radially contracted position and the valve 21 is closed. In its contracted position, the plug 3 has a maximum outer diameter which is less than that of the internal diameter of the upstanding vent pipe 42, as shown in FIG. 1. The device may be inserted through a suitably sized opening 44 in the wall of the vent pipe 42 with the tube 18 and sleeve 34 projecting outwardly of the vent pipe 42 through the opening 44. The hand wheel 38 may then be rotated to rotate the sleeve 34, drive the meshing bevel gears 30, 35 and rotate the sleeve 24. The device may be fabricated without a hand wheel and the sleeve 34 turned by hand or with a wrench. Rotation of the sleeve 24 causes the plug-actuating nut 26 to shift axially along the thread 25 and thereby expand the plug 35 into tight sealing engagement with the wall of the vent pipe 44, as shown in FIG. 2.

The vent pipe 44 may then be filled with water above the plug 3. After a sufficient length of time the level of the water in the vent pipe may be observed to determine whether or not it has dropped. It there has been no drop, the vent pipe is free of leaks. If there has been a drop, the vent pipe can be drained, as will be hereinafter described, and the leak or leaks repaired.

The water pressure in the vent pipe just above the plug 3 will depend upon the height of the column of water, but in some buildings it may reach the order of 150 pounds per square inch. Accordingly, the plug 3 should not be contracted while water remains in the vent pipe. In the present invention, the drain valve 21 may be opened to drain water from above the plug through the conduit 9. Thereafter, the hand wheel 38 is rotated to shift the nut 26 axially toward the bevel gear 30 so that the resiliency of the plug skirt 5 will allow the plug skirt to move to its contracted position. The lip 8 may serve as a stop for the nut 26. After contracting the skirt 5, the device may be removed from the vent pipe through the opening 44. In handling, the device 1 during insertion into and removal from the vent pipe and during expansion and contraction of the plug skirt, the extension 33 may serve as a handle, and for this purpose may be made as long as is desired. Furthermore, when draining the vent pipe, the extension 22 may have a hose or other conduit connected thereto to drain the water from the pipe into a suitable sewer drain.

In the present invention the elbow 17 is shown as being a 90 degree elbow, but it will be apparent that elbows of other angles may be used and the angles of the meshing faces of the bevel gears appropriately changed. Furthermore, the length of the tube 18 may be made as desired, and be somewhat longer than the sleeve 24, and with the valve 21 at the end of the tube 18.

The non-circular cross sections of the nut periphery 27 and the plug surface 29 prevent rotation of the nut 26 relative to the plug. The present embodiment of the invention shows the surfaces as being square, but it will be apparent that other non-circular surfaces may be used for this purpose.

The plug 3 may be readily removed for replacement with a new plug of the same or different size. This may be accomplished by removal of the nut 13 and then retracting the plug 3 from the tube 11.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and sought to be secured by Letters Patent is:

1. A device for testing for leaks in a pipe, said device comprising a resilient cup-shaped plug having an annular skirt with an exterior surface which is a surface of revolution arcuate in cross section and an interior surface that defines an axial cavity which is non-circular in cross section and tapers from one end of the skirt to the other, said skirt having a radially contracted position and a radially expanded position, conduit means extending through the plug and including tube means that has a portion which is generally axially of the plug and an additional portion which is at an angle to the first-mentioned portion, means for securing the plug means relative to the conduit means, a shiftable plug-expanding member within the cavity and having means for urging same to expand position, said means including an exterior surface of the member that has a shape that is similar to the shape of said cavity whereby said exterior and interior surfaces cooperate to prevent rotation of said member, and means including a member on said additional portion of the tube means in driving connection with the plug-expanding member for moving it selectively between the two position.

2. A device for testing for leaks in a pipe, said device comprising a resilient cup-shaped plug having an annular skirt with an axial cavity which is non-circular in cross section, said skirt having a radially contracted position and a radially expanded position, conduit means extending through the plug and including tube means that has a portion which is generally axially of the plug and an additional portion which projects laterally of the plug, means for securing the plug means relative to the conduit means, an axially shiftable plug-expanding member surrounding the conduit means and within the skirt cavity for urging same to expanded position, cooperating means on the plug and plug-expanding member for preventing rotation of the latter during axial shifting thereof, and driving means including a member rotatable on said additional portion of the tube means for axially shifting the plug-expanding member selectively between the two positions; said driving means further including a sleeve rotatable around the axis of the axially extending portion of the tube, a thread on said plug-expanding member, said sleeve having a thread for threaded engagement with the thread on said plug-expanding member, and cooperating means on said rotatable member and sleeve forming a driving connection for rotating the two together.

3. A device for testing for leaks in a pipe, said device comprising a resilient cup-shaped plug having an annular skirt with an interior surface surrounding the axis of the plug, said skirt having a radially contracted position in which the plug is of a smaller maximum diameter than that of the pipe to permit insertion of the plug into the pipe and removal of the plug from the pipe, said skirt also having an expanded position in which the plug forms a liquid tight closure in the pipe so that liquid may be introduced into the pipe on one side of the plug to check for leaks in the part of the pipe containing the liquid, conduit means extending through the plug and including tube means that has a portion which is generally axially of the plug and an additional portion which extends laterally of the plug for projection through the wall of the pipe, a rotatable sleeve surrounding the axial part of the tube means and having an external thread, a nut in threaded engagement with the thread and having a periphery in engagement with said interior surface, the periphery of said nut and said interior surface being such that axial movement of the nut in one direction along the thread expands the skirt to expanded position and axial movement of the nut in the opposite direction causes the skirt to contract to contracted position, said surfaces being of a shape to prevent rotation of the nut during axial movement thereof, driving means including means rotatable about the axis of the laterally projected part of the tube means for actuating said sleeve, and a valve in the laterally projected part of the tube means for opening the conduit means when the plug is in the expanded position within the pipe to drain liquid from the pipe through said conduit means.

4. A device according to claim 3 wherein the driving means further includes meshing bevel gears on the sleeve and rotatable means.

References Cited by the Examiner
UNITED STATES PATENTS

| | | | |
|---|---|---|---|
| 834,393 | 10/06 | Meister | 138—94 |
| 848,493 | 3/07 | Redenbaugh | 220—24.5 |
| 922,544 | 5/09 | Turner | 138—90 |
| 1,146,944 | 7/15 | Middleton | 220—24.5 |
| 1,747,933 | 2/30 | Goodman | 138—94 |

ISAAC LISANN, *Primary Examiner.*